May 17, 1932.  M. JANAS  1,858,858
TOY WAGON
Original Filed Feb. 14, 1929   2 Sheets-Sheet 1
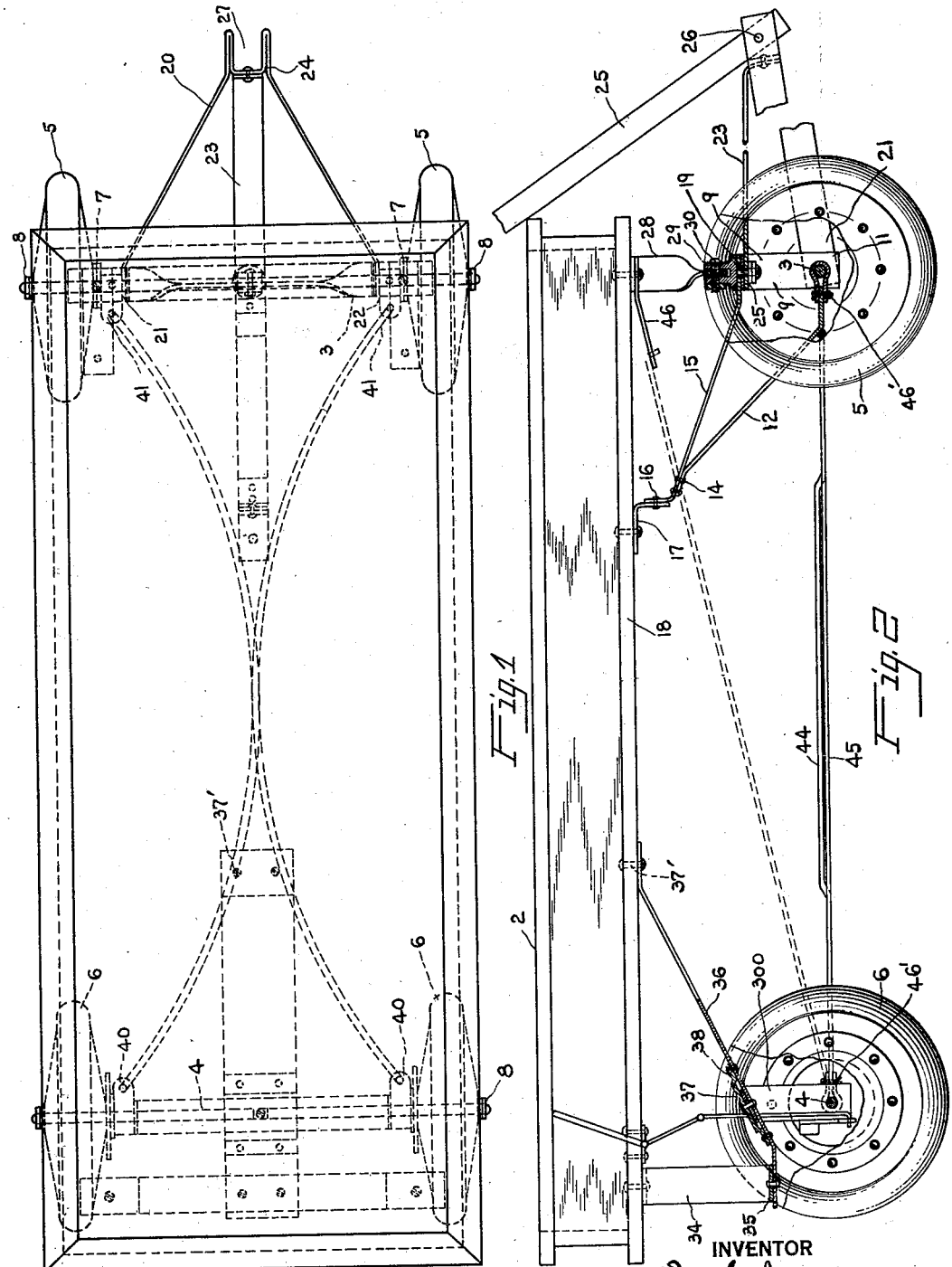
INVENTOR
Milo Janas
BY Frank M. Slough
his ATTORNEY

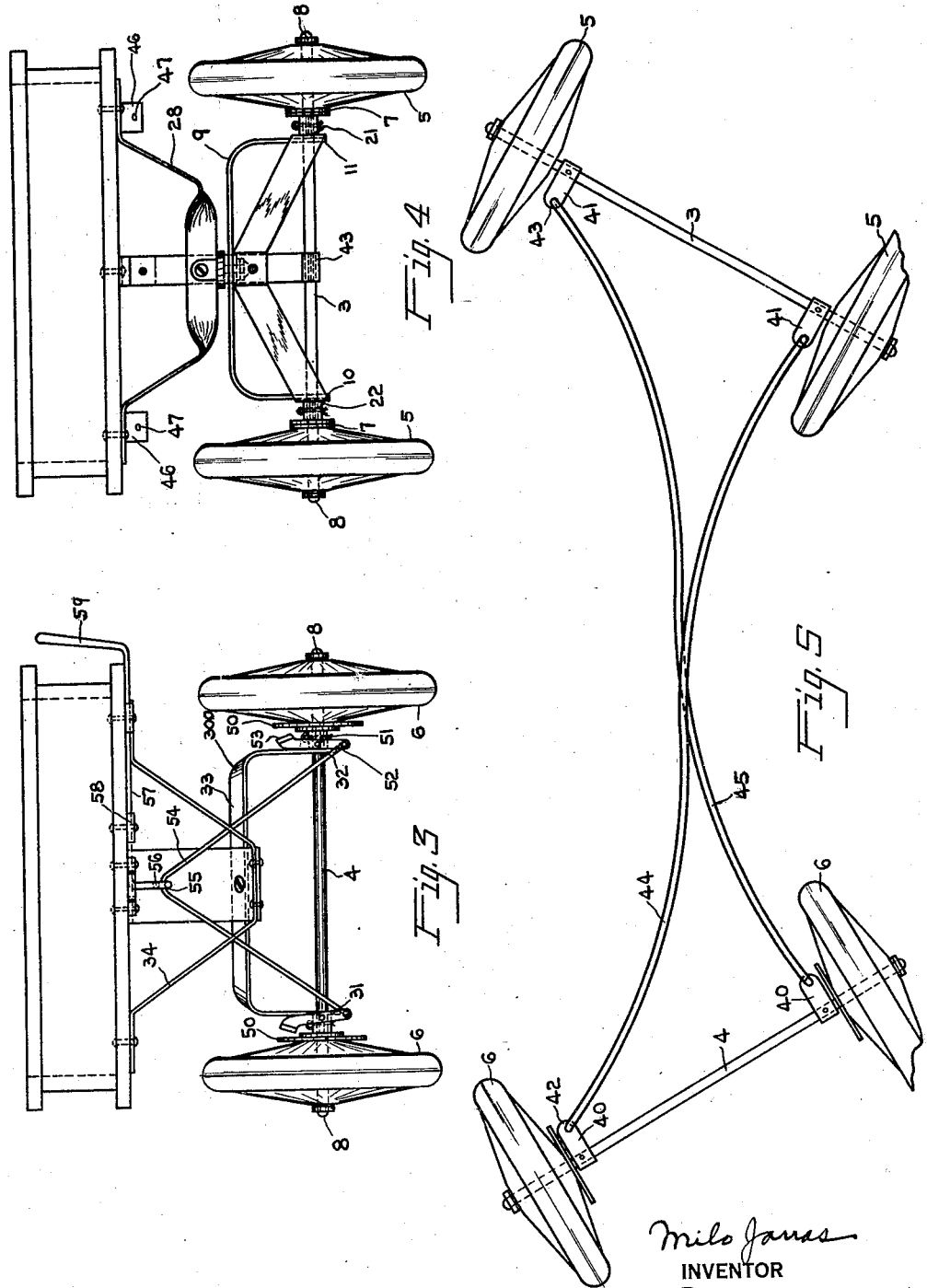

Patented May 17, 1932

1,858,858

UNITED STATES PATENT OFFICE

MILO JANAS, OF ELYRIA, OHIO

TOY WAGON

Application filed February 14, 1929, Serial No. 339,884. Renewed December 11, 1931.

My invention relates to vehicles and relates more particularly to coaster wagons.

An object of my invention is to provide a wagon wherein the body will tilt in negotiating corners to shift the center of gravity of the load, lessening the possibility of upsetting.

Another object of my invention is to provide a wagon that may be steered by tilting the body.

Another object of my invention is to provide a wagon of the class described wherein steering is accomplished with both the front and rear wheels.

Another object of my invention is to provide a wagon of the class described which may be easily and quickly converted to a wagon having a non-tilting body.

Another object of my invention is to provide a wagon having the above mentioned features and provided with improved type of brake not affected by the steering function of the wheels.

These and still other objects will become more apparent from the following description of an embodiment thereof, in which description reference will be had to the drawings forming a part of this specification and wherein;

Fig. 1 is a plan view of the wagon, the chassis, therefor being shown mostly in dotted lines;

Fig. 2 is a view partly in longitudinal section and partly in elevation of the wagon;

Figs. 3 and 4 are front and rear elevational views respectively of the wagon;

Fig. 5 is a diagrammatical view showing the wheels in a certain operative position.

Referring now to the drawings wherein like parts are designated by like reference characters, I show a wagon chassis which supports a box 2 of common construction. The chassis comprises a front axle 3 and a rear axle 4, having wheels 5 and 6 rotatably disposed on the ends of the axles, and held in place thereon by suitable nuts 8 disposed on the threaded ends of the axles, and washers 7. They are prevented from sliding toward each other by clamps 40 and 41 pinned to the axles by cotter pins.

The front axle, as best shown in Figs. 2 and 4, supports a U-shaped support or yoke 9 made of a suitable metallic strap, by passing through apertures in free lower ends 10 and 11 of the yoke. The axle is braced by a strap 12 swivably secured to a clip in the intermediate portion of the axle 3. The other end of the strap is riveted at 14 to a brace 15 which is pivotally secured at 16 to a clip 17 bolted to the bottom of the box. The other end of the strap 15 extends forward to the top of the yoke 9 and is pivotally secured thereon by the center pin 19.

A support for a tongue may be provided and comprises a substantially V-shaped member 20 having the free ends 21 and 22 secured about the axle adjacent the ends 10 and 11 of the yoke in a similar manner. A brace 23 is provided which is secured to the member 20 at 24 and has the other end 25 also pivotally held by the center pin 19. A tongue 25 may be secured by a pin 26 between the ends as at 27.

A bracket 28 is provided and has the free ends secured to the body adjacent the front end and sides as best shown in Figs. 2 and 4 and pivotally supports at its intermediate portion a clevis 29 by a pin 30, the center bolt 19 depending from the clevis and as previously described secures the braces 15 and 23 to the support 9.

The rear axle assembly is similar to the front and supports a U-shaped strap 300 by the free ends 31 and 32 engaging the axle.

As best shown in Figs. 2 and 3, the intermediate upper portion 33 of the strap extends parallel to the axle 4, but is inclined towards the front thereof. A V-shaped bracket 34 is secured to the box by bolting the free ends thereof to the box, adjacent the rear and sides. The lowermost portion 35 of the bracket 34 has riveted thereto a support 36 which slants upwardly and is fastened to the body by bolts or rivets at 37'. The support 36 is of sufficient length so that the angle at which it extends relative to the horizontal is the same as the angle at which the top 33 of the support 300 is bent. The support 300 is secured to the support 36 by a suitable rivet or pin 37, extending therethrough. I also provide a reinforcing strip 38 riveted to the support 36 which relieves the strain upon the pivot 37. On both the front and rear axles intermediate the wheels and the supports 9 and 300 respectively, I provide clamps, 40 in the rear and 41 in the front which, as previously described, are held to the axles by cotter pins.

As best shown in Fig. 5, the clamps 40 and 41 are each provided with suitable tongues 42 and 43 which have therein apertures adapted to receive the ends of a pair of curved rods 44 and 45. The rods may be secured therein by suitable pins 46', and the rods cross each other and operably connect the right front wheel with left rear wheel and left front wheel with right rear wheel. At the front of the box secured thereto with the ends of the support 28, are a pair of lugs 46 which have front ends of apertures 47 therein adapted to provide an alternate support for the rods 44 and 45.

As best shown in Fig. 5, when the front axle is turned in one direction, the rods 44 and 45 turn the rear axle in the opposite direction thus accomplishing a shorter turning radius for the chassis. When the rear axle turns, the body will tilt in the direction in which the vehicle is turning. The reason for this being that the slanting character of the horizontal portion 33 of the support 300 and the slanting character of the support 36 in conjunction therewith causes a camming action when the parts are moved relative to each other which tilts the body. The front end of the body being pivotally held to the front axle assembly will also tilt.

It is also to be noted that if the body is forcibly depressed on one side, the camming action will take place between the rear axle support and the support 36 causing the rear wheels to turn, which motion is also conducted to the front wheels by means of the rods 44 and 45. Thus we have a wagon which may be steered without the use of a tongue but by merely shifting the weight in the wagon box.

If it is desired to convert the wagon to the type wherein the box remains level, and the front wheels alone turn, the rods 44 and 45 are removed from the clips 41 on the front axle and placed in the apertures 47 in the lugs 46 immediately above. Thus the rear axle is held from turning relative to the body and hence the body will not tilt, while the front axle may be turned freely.

I also provide a brake which comprises a pair of flanges 50 secured to the hubs of each of the rear wheels at the inner sides thereof, adapted to act as brake drums. Swivably secured to each of the clips 40 at the rearmost portion thereof by bolts 51 are a pair of levers 52. Each of the levers is provided with a brake surface 53 adapted to contact with the face of the drum 50 which may be lined with suitable lining. The other ends extend toward each other and are engaged by an inverted V-shaped connecting link 54, the free ends of the link being bent and inserted in the apertures in the ends of the levers. The upper end of the link 54 at the angle 55 is engaged by the looped end 56 of the crank lever 57 which is rotatably secured to the bottom of the body by clips 58. The other end of the lever projects beyond the side of the box and is provided with an operating handle 59. When the handle 59 is rotated, the end 56 of the lever is rotated pulling up on the link 54 which rotates both of the levers 52 bringing the braking faces 53 in contact with the surfaces of the drums 50, thus applying the brakes. The connection at 55 and 56 of the link and operating lever is such that the axle and support 33 may be readily turned without effecting the braking action.

Having thus described my invention, in an embodiment thereof, I am aware that numerous and extensive departures may be made therefrom, but without departing from the spirit of my invention.

I claim:

1. In a toy vehicle, a bed, a front axle and a pair of wheels therefor, a depending front bracket on the bed, a bolster supported on the front axle and having swivelling connection with the bracket on vertical and horizontal axes, a rear axle and a pair of wheels therefor, a bolster supported on the rear axle and formed to have a planular upwardly forwardly sloping surface parallel to the rear axle, a depending rear bracket connected to the bed and having a planular surface in coincidence with said sloping bolster surface, the bolster and bracket having a pivot connection with each other on an axis at right angles to said surfaces.

2. In a toy vehicle, a bed, a front axle and a pair of wheels therefor, a depending front bracket on the bed, a bolster supported on the front axle and having swivelling connection with the bracket on vertical and horizontal axes, a rear axle and a pair of wheels therefor, a bolster supported on the rear axle and formed to have a planular upwardly forwardly sloping surface parallel to the rear axle, a depending rear bracket connected to the bed and having a planular surface in coincidence with said sloping bolster surface, the bolster and bracket having a pivot connection with each other on an axis at right angles to said surfaces and a pair of crossed reach rods each pivotally connected to the front and rear axles.

3. In a toy vehicle, a bed, a front axle and a pair of wheels therefor, a depending front bracket on the bed, a bolster supported on the front axle and having swivelling connection with the bracket on vertical and horizontal axes, a brace between the bed and the swivelling connection, a rear axle and a pair of wheels therefor, a bolster supported on the rear axle and formed to have a planular upwardly forwardly sloping surface parallel to the rear axle, a depending rear bracket connected to the bed and having a planular surface in coincidence with said sloping bolster surface, the bolster and bracket having a pivot connection with each other on an axis at right angles to said surfaces, a brace connecting the rear bracket and the bed and a pair of crossed reach rods each connected to the front and rear axles on vertical pivots.

4. In a toy vehicle, a bed, a front axle and a pair of wheels therefor, a depending front bracket on the bed, a bolster supported on the front axle and having swivelling connection with the bracket on vertical and horizontal axes, a rear axle and a pair of wheels therefor, a bolster supported on the rear axle and formed to have a planular upwardly forwardly sloping surface parallel to the rearwardly sloping surface parallel to the rear axle, a depending rear bracket connected to the bed and having a planular surface in coincidence with said sloping bolster surface, the bolster and bracket having a pivot connection with each other on an axis at right angles to said surfaces, and a pair of crossed reach rods each pivotally connected to the rear axle and detachably pivotally connected at their forward ends to the front axle, and supporting means on the bed for supporting and rigidly connecting the said forward ends of the reach rods to the bed when detached from the front axle.

5. In a toy vehicle, a bed, front and rear wheel supported axles, a pair of crossed reach rods each pivotally connected to the rear axle and detachably pivotally connected at their forward ends to the front axle, and supporting means on the bed for supporting and rigidly connecting the said forward ends of the reach rods to the bed when detached from the front axle.

6. In a toy vehicle, a bed, front and rear wheel supported axles, a pair of crossed reach rods each pivotally connected to the rear axle and detachably pivotally connected at their forward ends to the front axle, and supporting means for supporting the said forward ends of the reach rods relatively stationarily with respect to the bed when detached from the front axle.

7. In a toy vehicle, a bed, front and rear wheel supported axles, a pair of crossed reach rods each pivotally connected to the rear axle and detachably pivotally connected at their forward ends to the front axle, a pair of supports on the bed on which the said forward ends of the reach rods may be supported and to which they may be rigidly connected, when detached from the front axle.

In testimony whereof I hereunto affix my signature this twenty-second day of January, 1929.

MILO JANAS.